Oct. 29, 1968  R. A. SCOTT  3,407,973

AUTOMATIC LIQUID MEASURING AND DISPENSING DEVICE

Filed July 19, 1966

ROBERT A. SCOTT
Edwin E. Greigg
ATTORNEY

United States Patent Office 3,407,973
Patented Oct. 29, 1968

3,407,973
AUTOMATIC LIQUID MEASURING AND
DISPENSING DEVICE
Robert A. Scott, R.F.D. 5, Westminster, Md. 21157
Filed July 19, 1966, Ser. No. 566,277
4 Claims. (Cl. 222—373)

ABSTRACT OF THE DISCLOSURE

A liquid measuring and dispensing device having a measuring chamber which is filled with liquid through a supply conduit extending a given distance below the liquid supply source. A discharge conduit connected to the measuring chamber extends above the level of the liquid supply and is of a length smaller than the distance to which the supply conduit extends below the liquid supply level. A gas pressure source connected to the measuring chamber forces the liquid in the chamber through the discharge conduit and when the pressure is released, the chamber is automatically refilled through the supply conduit.

---

This invention relates to liquid measuring and dispensing devices and, more particularly, to such devices for dispensing a measured amount of liquid from a large liquid supply source.

In mixing liquids of differing compositions in predetermined proportions, accuracy and speed are essential, especially when the mixing operation is repeated for an indefinite period of time. In such cases, naturally, it is desirable that each batch resulting from a single mixing operation be of equal volume and equal proportions to each of the remaining batches. This high degree of accuracy has been difficult to achieve for mechanical methods of mixing because such methods inevitably involve numerous moving parts in contact with the liquid to be measured and dispensed, and, further, such methods are dependent on the fluctuations of level in the liquid supply.

Accordingly, the object of this invention is to provide a liquid measuring and dispensing device which is simple to manufacture and has no moving parts in contact with the liquid to be dispensed.

It is a further object of this invention to provide a liquid measuring and dispensing device in which a given quantity of liquid may be dispensed with an accuracy substantially independent of variations in the level of the liquid supply.

It is a further object of this invention to provide a liquid measuring and dispensing device in which the amount of liquid to be dispensed can be readily adjusted by means of a simple manual operation.

Still a further object of this invention is to provide a liquid measuring and dispensing device which, after dispensing a given amount of liquid, is automatically refilled.

It is yet another object of this invention to provide a liquid measuring and dispensing device which can be readily converted to a liquid level control device for a liquid receiver receptacle.

According to one embodiment utilizing the principles of this invention, there is provided a measuring chamber which is adapted to be filled with liquid entering through a supply conduit from a liquid supply source. The measuring chamber is connected to a gas pressure source which, when activated, forces the liquid in the measuring chamber back through a unique supply conduit to the supply receptacle until the liquid in the chamber falls below the level of the supply conduit inlet port. At this point the remaining volume under the continued pressure will be discharged through a discharge conduit. After the discharge conduit no longer discharges liquid, the gas pressure is released allowing the measuring chamber to automatically be refilled through the supply conduit.

Figure 1:
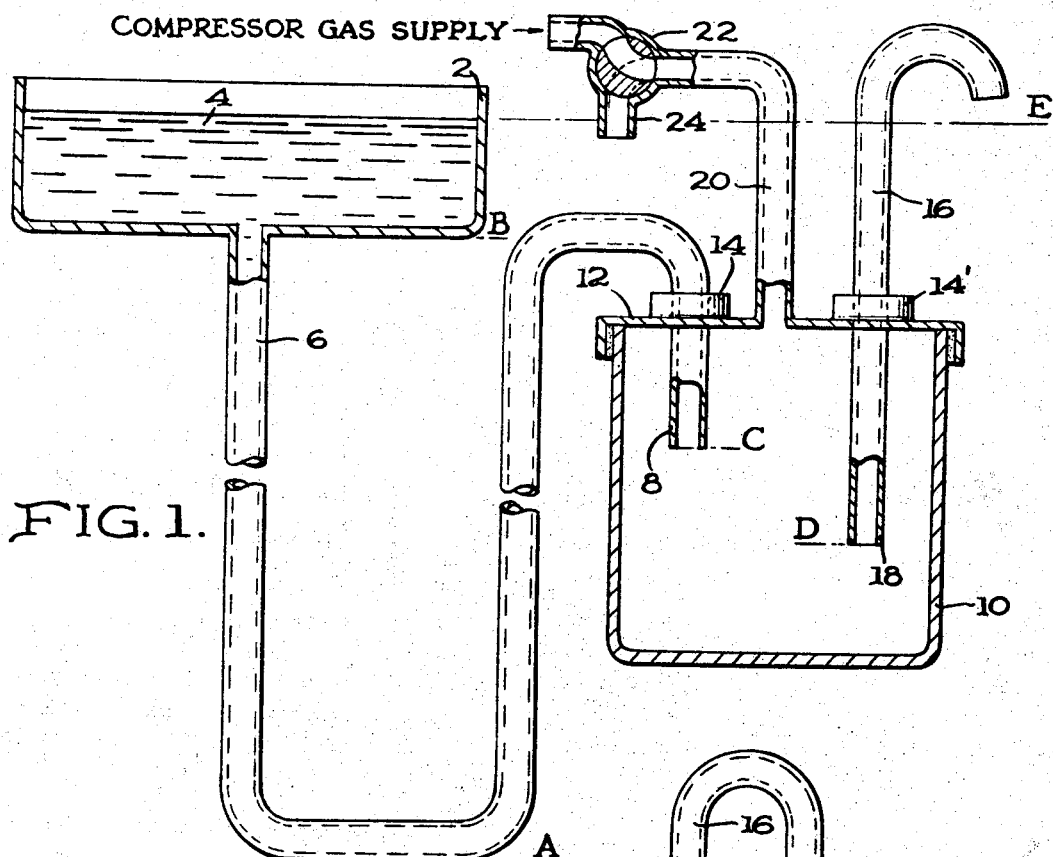
Figure 2:
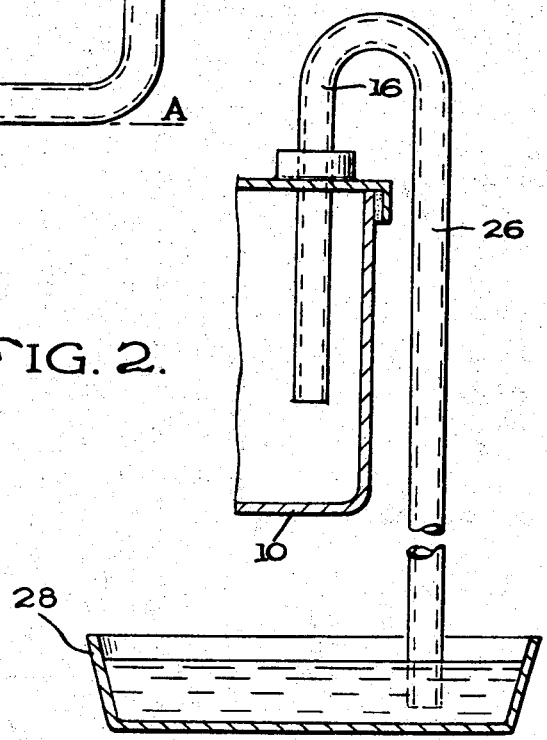

Other objects and advantages will become apparent from a study of the following specification and drawings, in which:

FIGURE 1 is an elevational view of an operating device employing the principles of this invention; and FIGURE 2 is a partial elevational view showing a modification of the discharge tube for use as a liquid level control device.

Referring now to FIGURE 1, there is shown a supply tank 2 having a volume of liquid 4 therein. Extending from the bottom of the tank 2 is a flexible tube or hose 6 forming a loop and having its outlet end 8 connected to the top 12 of a measuring chamber 10. As shown, the outlet end 8 may be of substantial length so as to be friction-fitted through a suitable bushing 14 of elastic material such as rubber or the like, located on the top 12. As will be discussed below, the outlet end 8 may have its axial position varied within the chamber 10 by means of the friction-fitted bushing 14. Also connected on the top 12 of the chamber 10 is a discharge tube 16 having an inlet end 18 extending down into the chamber 10. The tube 16 is friction-fitted in the same manner as tube 6 through a bushing 14'. Also connected to the top 12 of the chamber 10 is a gas pressure supply hose 20 having a suitable two-way valve 22 with a vent to atmosphere 24 for allowing gas pressure to escape from the chamber 10 when the valve 22 is closed. The valve 22, of course, may be manually operated for regulating a suitably supply of compressed gas, such as air, to the chamber 10.

According to the principles of this invention the device operates as follows. With the valve 22 closed, and the measuring chamber 10 consequently vented to atmospheric pressure, liquid will flow from the supply tank 2 through the tube 6 into the chamber 10 to a level equal with the level of the liquid supply 4 in the supply tank 2. This condition is shown in FIG. 1 of the drawing where it is seen that the liquid level rises in both the conduits 16 and 20 to a height determined by the level of liquid in the supply tank 2. The valve 22 is then opened, and gas pressure will enter chamber 10 through conduit 20, thereby forcing the liquid therein down and out through inlet 8 of the supply conduit 6 until the liquid level falls below the inlet end, or the level C. It is important that the distance between the lowest point of the tube 6 and the lowest possible level that the liquid supply 4 can achieve, namely, the distance A–B, be greater than the length of the discharge conduit 16, namely, D–E. This difference in the height of the liquid columns between conduit 6 and conduit 16 allows for the remaining volume of water below the level C, already mentioned, to flow through the outlet end 18 of the discharge conduit 16; the higher liquid column in conduit 6 preventing the air pressure from escaping therethrough. When the liquid level falls below the outlet 18, or level D, then an amount of liquid represented by the distance C–D will have been dispensed. This amount plus the known amount of liquid already in the discharge conduit 16 will constitute an accurate measure of the dispensed fluid. At this point the valve 22 may be shut off since only air will escape through the discharge conduit 16. Once the air pressure has been released, flow will begin again from the supply conduit 6 and continue until the chamber 10 is refilled to the level shown in FIG. 1, as previously indicated.

The volume of liquid to be dispensed may be varied by adjusting the axial position of the discharge conduit 16 or the inlet end 8 of the supply conduit 6 along their respective bushings 14', 14. In this way the distance C–D may be varied to regulate the amount of liquid dispensed. It may be seen that the closer together the ends 8 and 18 are, with respect to each other, the smaller the amount of liquid will be dispensed, and by the same reasoning, the farther apart the ends 8 and 18 are, with respect to each other, the larger the amount of liquid will be dispensed. Both of the conduits 16 and 6 may be calibrated along their respective portions extending into the chamber 10 for purposes of accurate measurement. It should also be understood that the amount of liquid in the discharge conduit 16 will vary with the level of the liquid supply 4. However, if the conduit 16 is small, the error in volume will be correspondingly small. If, however, greater accuracy is desired, or if a relatively large diameter discharge tube is utilized, then the level of the liquid supply can be easily regulated by conventional means, such as a float operated valve or the like. Also, if inlet end 8 is raised to the highest possible position, the amount of liquid returned to the supply tank by the gas pressure will be reduced, further contributing to stability of level in the liquid supply.

It is possible that the device according to this invention may be used for controlling the level of liquid in a receiver receptacle. For this purpose, the discharge tube 16 may be extended downwardly into a receiver receptacle 28 located below the level of the liquid supply 4 as shown in FIG. 2. In this arrangement, the flow initiated in the discharge tube 16, in the manner above described, may start a siphon down the extended portion 26 of the discharge conduit 16. The siphoning action will lower the gas pressure normally required to insure complete discharge of the liquid from the chamber 10. Thus, the distance A–B in the supply conduit loop need not be as great as shown in FIG. 1 for preventing the escape of pressure therethrough. However, it is essential that the counter-pressure presented by the liquid column A–B be great enough to contain any gas pressure that is used. In order to insure that the level maintained in the receiving receptacle is accurate, the gas pressure can be regulated by a suitable pressure regulating means such as a diaphragm-operated regulator, or a bleed-off tube submerged at a given depth in liquid, or the like.

Although several embodiments of the invention have been depicted and described, it will be apparent that these embodiments are illustrative in nature and that a number of modifications in the apparatus and variations in its end use may be effected without departing from the spirit or scope of the invention as defined in the appended claims.

That which is claimed is:

1. In a liquid dispensing device for use with a liquid supply receptacle having a quantity of liquid therein defining a liquid level, the combination comprising, a liquid measuring chamber, a supply conduit connecting said supply receptacle and said chamber, said conduit having a portion thereof extending a given distance below the outlet end of said conduit connecting said chamber, a discharge conduit connected to said chamber having a portion thereof extending above said liquid supply level a distance less than said distance said supply conduit extends below the outlet end thereof, and means for supplying gas pressure to said chamber whereby liquid in said chamber is initially forced out through said outlet end of said supply conduit when the liquid level in said chamber is above said outlet end and through said discharge conduit when said liquid level falls below said outlet end of said supply conduit.

2. In a liquid dispensing device for use with a liquid supply receptacle having a quantity of liquid therein defining a liquid level, the combination comprising, a liquid measuring chamber, a supply conduit connecting said supply receptacle and said chamber, said conduit having a portion thereof extending a given distance below the outlet end of said conduit connecting said chamber, a discharge conduit connected to said chamber having its inlet end positioned below said outlet end of said supply conduit, said discharge conduit extending from its inlet end to above the liquid level in said supply receptacle a distance less than said distance said supply conduit extends below the outlet end thereof, and means for supplying gas pressure to said chamber whereby liquid in said chamber is initially forced out through said outlet end of said supply conduit when the liquid level in said chamber is above said outlet end and through said discharge conduit when the liquid level falls below said outlet end of said supply conduit.

3. In a liquid dispensing device according to claim 2, further comprising a means for adusting positioning the inlet end of said discharge conduit within said measuring chamber.

4. In a liquid dispensing device according to claim 3, further comprising a means for adjustably positioning the outlet end of said supply conduit within said measuring chamber.

References Cited

UNITED STATES PATENTS

| | | | |
|---|---|---|---|
| 1,350,517 | 7/1920 | Pridgen | 222—373 X |
| 2,400,955 | 5/1946 | Samel | 222—464 X |
| 2,520,398 | 7/1950 | Hanks | 222—373 |

FOREIGN PATENTS 166,551  12/1921  Great Britain.

WALTER SOBIN, *Primary Examiner.*